United States Patent
Chen et al.

(10) Patent No.: US 7,970,228 B2
(45) Date of Patent: Jun. 28, 2011

(54) IMAGE ENHANCEMENT METHODS WITH CONSIDERATION OF THE SMOOTH REGION OF THE IMAGE AND IMAGE PROCESSING APPARATUSES UTILIZING THE SAME

(75) Inventors: Shing-Chia Chen, Tainan County (TW); Ling-Hsiu Huang, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 971 days.

(21) Appl. No.: 11/847,394

(22) Filed: Aug. 30, 2007

(65) Prior Publication Data

US 2009/0060377 A1 Mar. 5, 2009

(51) Int. Cl.
*G06K 9/40* (2006.01)
*H04N 5/76* (2006.01)

(52) U.S. Cl. .................................. 382/254; 348/229.1

(58) Field of Classification Search .................. 382/168, 382/171–172, 254, 270, 274; 348/229.1, 348/221.1, 362
See application file for complete search history.

(56) References Cited

U.S. PATENT DOCUMENTS

| | | | | |
|---|---|---|---|---|
| 5,020,123 A | * | 5/1991 | Thompson | 382/175 |
| 5,845,017 A | * | 12/1998 | Keyes | 382/261 |
| 5,925,880 A | * | 7/1999 | Young et al. | 250/252.1 |
| 6,034,789 A | * | 3/2000 | Kawai | 358/474 |
| 6,157,469 A | * | 12/2000 | Mestha | 358/504 |
| 7,102,697 B2 | * | 9/2006 | Lei et al. | 348/678 |
| 7,376,288 B2 | * | 5/2008 | Huang et al. | 382/300 |
| 7,538,801 B2 | * | 5/2009 | Hu et al. | 348/229.1 |

* cited by examiner

*Primary Examiner* — Vu Le
*Assistant Examiner* — Andrae S Allison
(74) *Attorney, Agent, or Firm* — Thomas|Kayden

(57) ABSTRACT

An image processing method applied in an image processor for processing an image including first pixels each having a corresponding pixel value. The pixel values of first pixels are distributed within a first distribution range. Second pixels comprise a region and are obtained from first pixels when a difference between pixel values of adjacent second pixels is less than a predetermined value. Gained pixel values are obtained after applying a gain to the image. An amount of distortion is obtained by summing up weighted differences between a reference pixel value and gained pixel value of first pixels having gained pixel value not distributed within first distribution range. A weighting factor does not equal to 1 when first pixel is within the region, and equals to 1 when first pixel is outside the region. The gain is updated according to the distortion. Processed image is obtained by applying the updated gain.

24 Claims, 6 Drawing Sheets

FIG. 3

| 100 | 100 | 100 | 100 | 100 | 100 |
|---|---|---|---|---|---|
| 100 | 235 | 245 | 240 | 230 | 100 |
| 100 | 240 | 250 | 245 | 230 | 100 |
| 100 | 245 | 250 | 245 | 230 | 100 |
| 100 | 240 | 245 | 240 | 230 | 100 |
| 100 | 100 | 100 | 100 | 100 | 100 |

FIG. 2

| 100 | 100 | 100 | 100 | 100 | 100 |
|---|---|---|---|---|---|
| 100 | 235 | 245 | 240 | 230 | 100 |
| 100 | 240 | 250 | 245 | 230 | 100 |
| 100 | 245 | 250 | 245 | 230 | 100 |
| 100 | 240 | 245 | 240 | 230 | 100 |
| 100 | 100 | 100 | 100 | 100 | 100 |

FIG. 5

| 100 | 100 | 100 | 100 | 100 | 100 |
|---|---|---|---|---|---|
| 100 | 100 | 235 | 245 | 240 | 230 | 100 |
| 100 | 240 | 250 | 245 | 230 | 100 |
| 100 | 245 | 250 | 245 | 230 | 100 |
| 100 | 240 | 245 | 240 | 230 | 100 |
| 100 | 100 | 100 | 100 | 100 | 100 |

| 120 | 120 | 120 | 120 | 120 | 120 |
|---|---|---|---|---|---|
| 120 | 282 | 294 | 288 | 276 | 120 |
| 120 | 288 | 300 | 294 | 276 | 120 |
| 120 | 294 | 300 | 294 | 276 | 120 |
| 120 | 288 | 294 | 288 | 276 | 120 |
| 120 | 120 | 120 | 120 | 120 | 120 |

| 100 | 100 | 100 | 100 | 50  | 200 | 100 |
| 100 | 100 | 100 | 100 | 5   | 100 | 200 |
| 100 | 100 | 100 | 100 | 250 | 100 | 100 |
| 10  | 5   | 5   | 200 | 100 | 5   |     |
| 5   | 10  | 5   | 100 | 200 | 0   |     |
| 0   | 5   | 0   | 200 | 100 | 200 |     |

FIG. 6

| 100 | 100 | 100 | 100 | 50  | 200 | 100 |
| 100 | 100 | 100 | 100 | 5   | 100 | 200 |
| 100 | 100 | 100 | 100 | 10  | 100 |     |
| 10  | 5   | 5   | 200 | 100 | 5   |     |
| 5   | 10  | 5   | 100 | 200 | 0   |     |
| 0   | 5   | 0   | 200 | 100 | 200 |     |

IMAGE ENHANCEMENT METHODS WITH CONSIDERATION OF THE SMOOTH REGION OF THE IMAGE AND IMAGE PROCESSING APPARATUSES UTILIZING THE SAME

BACKGROUND OF THE INVENTION

1. Field of the Invention

The invention relates to an image processing method, and more particularly to image processing methods with consideration of the distribution characteristics of the image.

2. Description of the Related Art

With the development of digital signal processing, digital image processing technology has also advanced. The digitalization of an image converts an image into a form which can be stored in a computer's memory or some storage device such as a hard disk or CD-ROM (Compact Disk Read Only Memory). Once the image has been digitalized, it can be operated upon by various image processing operations, such as image compression, image enhancement . . . etc.

In computer graphics, image enhancement improves the quality of the digitally stored image by adjusting the pixel values which form the image, or by further using filters for altering images in various ways. Before image enhancement processing, the image can be analyzed first. Image analysis can be performed utilizing statistic graphics or functions that reveal the characteristics of the image, such as a histogram representing the pixel value distribution of the pixels forming the image.

After analyzing the image, enhancement can be performed according to the analyzed results. There are many types of image enhancements, including brightness adjustment, contrast enhancement, noise removal, image size alerting, image cropping, and unwanted image removing, etc. Brightness adjustment is executed by applying a gain value to the pixel value forming the image for increasing or decreasing the pixel values. Contrast enhancement is executed by increasing or decreasing the contrast between high pixel values and low pixel values. Noise removal is executed by removing the noise in image, such as JPEG (Joint Photographic Experts Group) artifacts, dust, scratches, and so on. Image size alerting is executed by scaling the images and making them larger or smaller. Image cropping is executed by creating a new image by removing a desired rectangular portion from the image being cropped. Unwanted image removing is executed by removing some unwanted objects in the image and draw focus to the image subject.

Although image enhancement is used to improve the image quality, it also causes some image distortion when changing the characteristics of the image. Thus, image analysis and enhancement methods that can reduce image distortion need to be developed.

BRIEF SUMMARY OF THE INVENTION

Image processing methods are provided. An exemplary embodiment of an image processing method is applied in an image processor, wherein the image processor receives an image from a host and outputs a processed image to a display device. The image comprises a plurality of first pixels each having a corresponding pixel value, wherein the corresponding pixel values of the first pixels are distributed within a first distribution range, and the first distribution range is bounded between a maximum pixel value and a minimum pixel value. The image processing method comprises obtaining a plurality of second pixels from the first pixels, wherein a difference between the pixel values of adjacent second pixels is less than a predetermined value, and the second pixels comprise a region, applying a gain to the image for adjusting the corresponding pixel values of the first pixels, obtaining a plurality of gained pixel values of the first pixels after applying the gain, obtaining an amount of distortion by summing up a plurality of weighted differences between a reference pixel value and the gained pixel value of each first pixel having the gained pixel value not distributed within the first distribution range, wherein a weighting factor of the weighted difference corresponding to the first pixel does not equal to 1 when the corresponding first pixel is within the region, and equals to 1 when the corresponding first pixel is outside the region, updating the gain according to the amount of distortion, and obtaining the processed image by applying the updated gain to the corresponding pixel values of the first pixels in the image.

An exemplary embodiment of an image processing apparatus processes an image provided by a host and outputs a processed image to a display device. The image comprises a plurality of first pixels each having a corresponding pixel value, wherein the corresponding pixel values of the first pixels are distributed within a first distribution range, and the first distribution range is bounded between a maximum pixel value and a minimum pixel value. The image processing apparatus comprises a memory buffer storing gain data indicating a gain, an image analyzer obtaining a plurality of second pixels from the first pixels, wherein a difference between the pixel values of adjacent second pixels is less than a predetermined value, and the second pixels comprise a region, accessing the gain data stored in the memory buffer, applying the gain corresponding to the gain data to the image for adjusting the corresponding pixel values of the first pixels, obtaining an amount of distortion by summing up a plurality of weighted differences between a reference pixel value and the gained pixel value of each first pixel having the gained pixel value not distributed within the first distribution range, wherein a weighting factor of the weighted difference corresponding to the first pixel does not equal to 1 when the corresponding first pixel is within the region, and equals to 1 when the corresponding first pixel is outside the region, and an image processor updating the gain data stored in the memory buffer according to the amount of distortion, and obtaining the processed image by applying the updated gain corresponding to the updated gain data to the corresponding pixel values of the first pixels in the image.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 2 illustrates an exemplary 8-bit grayscale image;

FIG. 3 illustrates the 8-bit grayscale image shown in FIG. 2 with obtained second pixels and smooth regions;

FIG. 4 illustrates the gained 8-bit grayscale image;

FIG. 5 illustrates the 8-bit grayscale image shown in FIG. 2 with obtained second pixels and smooth regions different from those obtained in FIG. 3;

FIG. 6 illustrates another exemplary 8-bit grayscale image;

FIG. 7 illustrates the 8-bit grayscale image shown in FIG. 6 with obtained second pixels and smooth regions;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
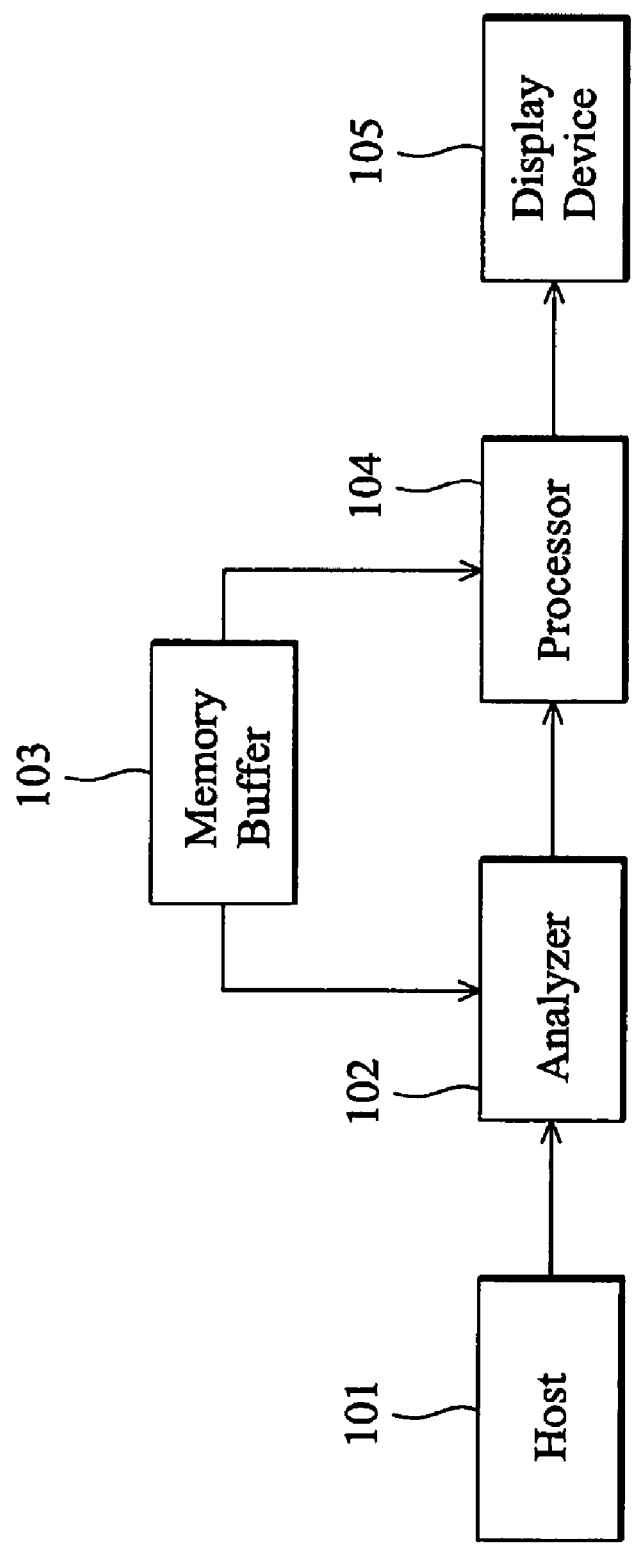
FIG. 1 illustrates an image processing apparatus according to one embodiment of the invention.

FIG. 1 illustrates an image processing apparatus 10 according to an embodiment of the invention. Image processing apparatus 10 comprises a host 101, an image analyzer 102, a memory buffer 103, an image processor 104, and a display device 105. Image analyzer 102 analyses the distribution characteristics of an image provided by host 101, accesses a gain stored in memory buffer 103, applies the gain to the image for adjusting the corresponding pixel values of the pixels in the image, estimates an amount of distortion after applying the gain, and outputs an estimated result to image processor 104. Image processor 104 updates the gain stored in memory buffer 103 according to the estimated result, applies the updated gain to the image, and outputs the processed image to the display device 105. Display device 105 displays the processed image. According to an embodiment of the invention, image analyzer 102 analyses the distribution characteristics of the pixel values in image beforehand, and estimates the distortion of image after applying the gain with consideration of the analyzed distribution characteristics. Image processor 104 updates the gain to a proper value according to the estimated results received from image analyzer 102. Thus, the image can be enhanced by image processor 104 with a proper gain. The detailed image processing method of image processing apparatus 10 will be described in the following.

FIG. 2 shows an exemplary 8-bit grayscale image 200 provided by host 101, wherein image 200 comprises 36 first pixels each having a corresponding grayscale value. For an 8-bit grayscale image, the maximum possible grayscale value is 255 and the minimum possible grayscale value is 0. Thus, the grayscale values for an 8-bit grayscale image are distributed within a first distribution range bounded between 0-255. According to an embodiment of the invention, image analyzer 102 first retrieves a plurality of second pixels from the first pixels, wherein a difference between the pixel values of adjacent second pixels is less than a predetermined value. The second pixels can be retrieved from the first pixel according to a plurality of different algorithms. For example, when a summation of the difference between the corresponding pixel values of the first pixel and its right adjacent pixel and the difference between the corresponding pixel values of the first pixel and its left adjacent pixel is less than the predetermined value, the first pixel is regarded as the second pixels. The predetermined value can be chosen as any natural number, for example, the predetermined value here can be chosen as 32 for an 8-bit grayscale image. The retrieving algorithm can also deduce that when the difference between the corresponding pixel values of the first pixel and its right adjacent pixel is less than the predetermined value, the first pixel and its right adjacent pixel are regarded as second pixels. Here, the predetermined value can be chosen as 16 for an 8-bit grayscale image. Take image 200 as shown in FIG. 2 as an example, because the difference between grayscale values of the first pixel 211 and its right adjacent pixel 212 is 0, which is less than 16, the first pixels 211 and 212 are regarded as second pixels. Next, the first pixel 213 is also regarded as a second pixel since the difference between grayscale values of the first pixel 212 and its right adjacent pixel 213 is also less than 16. After applying the retrieving algorithm along the first row of image 200, a plurality of second pixels 211, 212, 213, 214, 215 and 216 are obtained and they comprise a smooth region 311 as shown in FIG. 3. According to an embodiment of the invention, the smooth region is a region comprising a plurality of pixels with their corresponding pixel values close to each other.

After applying the retrieving algorithm to the second row of image 200, second pixels 222, 223, 224 and 225 are also obtained and they comprise the smooth region 312 as shown in FIG. 3. When further applying the retrieving algorithm to the remaining rows in image 200, smooth regions 313, 314, 315 and 316 that comprise a plurality of second pixels as shown in FIG. 3 are also obtained. It is noted that for a boundary pixel in an image, such as the first pixel 216 in image 200, the retrieving algorithm will not be executed since there is no right adjacent pixel to pixel 216. After obtaining the second pixels in image 200, image analyzer 102 accesses a gain from memory buffer 103, and applies the gain to image 200 for adjusting the corresponding pixel values of the first pixels in the image 200. The gain can be set as any number according to different image enhancement requirements. For example, the gain can be set as a value larger than 1 so as to increase the pixel values of the image, or the gain can be set as a value less than 1 so as to decrease the pixel values of the image. FIG. 4 illustrates an image 201 that is obtained by applying a gain to image 200 for adjusting the pixel values of the first pixels, wherein the gain is set as 1.2 and the pixel values of the first pixels are multiplied by the gain. Thus, image 201 comprises 36 first pixels each having a gained pixel value. Since the gain used here is larger than 1, the grayscale values in image 200 are increased and some of them (the dotted pixels shown in FIG. 4) are distorted for being weighted to a value exceeding 255.

Next, image analyzer 102 starts to estimate the amount of distortion. When estimating the amount of distortion, different weighting factors can be applied to the distorted pixels with different distribution characteristic. Thus, the estimated distortion is the amount of distortion estimated with the consideration of the distribution characteristics of the image. According to an embodiment of the invention, the amount of distortion of image 201 can be obtained by $$\sum_{x} z - x|y_x - K| \qquad (1.1)$$

wherein x represents the pixel with gained pixel value that is not distributed within the first distribution range, $y_x$ represents the corresponding gained pixel value of pixel x, $z_x$ represents the corresponding weighting factor of pixel x, and K represents a reference pixel value. In the embodiment of the invention as shown in FIG. 4, K is set as the maximum pixel value, that is 255, x is the pixel with gained pixel value exceeding 255, and $z_x$ is set as 1.5 when x is inside the smooth regions 311~316 as shown in FIG. 3 or set as 1 when x is not inside the smooth regions 311~316. Since all the distorted pixels (the dotted pixels in FIG. 4) are respectively within the smooth regions 312, 313, 314 and 315 shown in FIG. 3, all the distorted pixels are weighted by 1.2 when estimating the amount of distortion. Thus, the amount of distortion estimated according to function (1.1) by image analyzer 102 is 792.

After obtaining the estimated amount of distortion, image analyzer 102 passes it to image processor 104. Image processor 104 updates the gain according to the estimated amount of distortion. The gain can be updated by a plurality of methods. For example, an acceptable amount of distortion can be previously set. If the estimated amount of distortion exceeds the acceptable amount of distortion, it means that the distortion after applying the gain is not acceptable. Thus, the gain can be further increased or decreased. According to the embodiment of invention, if the acceptable amount of distortion is set as 700, the estimated amount of distortion which exceeds 700 reveals that the gain should be reduced to a smaller value. Thus, image processor 104 updates the gain to another number, such as 1.05, applies the updated gain to the corresponding pixel values of the first pixels in the image 200, and obtains a processed image. Display device 105 finally displays the processed image received from image processor 104.

According to another embodiment of the invention, the process for obtaining the second pixels may not be limited to only one row or one column. For example, the algorithm for obtaining the second pixels can be that when the difference between the corresponding pixel values of the first pixel and its right adjacent pixel and the difference between the corresponding pixel values of the first pixel and its lower adjacent pixel are less than the predetermined value, the first pixel, the right adjacent pixel of the first pixel, and the lower adjacent pixel of the first pixel are all regarded as the second pixels. Thus, the obtained second pixels can comprise a smooth region that is not limited to only one row or one column. Take image 200 shown in FIG. 2 as an example, since the difference between first pixel 211 and its right adjacent pixel 212 and the difference between first pixel 211 and its lower adjacent pixel 222 are both less than 16 (the predetermined value), first pixels 211, 212, and 221 are regarded as the second pixels and comprise a smooth region 511 as shown in FIG. 5. In FIG. 5, the smooth region 512 comprising a plurality of second pixels can also be obtained by applying the same algorithm.

According to another embodiment of the invention, the algorithm for obtaining the second pixels can also be that when the corresponding pixel values of a plurality of first pixels comprising a region are all distributed within a second distribution range smaller than the first distribution range, those first pixels are regarded as the second pixels and the region is referred to as the smooth region. For example, when the second distribution range is bounded between grayscale values 90-110, all the pixels in image 200 with grayscale value 100 can be regarded as the second pixels and referred to as the smooth region since they are all distributed with the second distribution range.

FIG. 6 shows another exemplary 8-bit grayscale image 600 provided by host 101, wherein image 600 also comprises 36 first pixels each having a corresponding grayscale value. The grayscale values of image 600 are distributed within a first distribution range bounded between 0-255. According to the embodiment of the invention, image analyzer 102 first obtains a plurality of second pixels from the first pixels. The algorithm for obtaining the second pixels used here is that when the difference between the corresponding pixel values of the first pixel and its right adjacent pixel and the difference between the corresponding pixel values of the first pixel and its lower adjacent pixel are less than a predetermined value, the first pixel, the right adjacent pixel of the first pixel, and the lower adjacent pixel of the first pixel are regarded as the second pixels. The predetermined value chosen here is 20 for an 8-bit grayscale image 600. Take the first pixel 611 in image 600 as an example, because the difference between grayscale values of the first pixel 611 and its right adjacent pixel 612 is 5, which is less than 20, and the difference between grayscale values of the first pixel 611 and its lower adjacent pixel 621 is 5, which is also less than 20, the first pixels 611, 612 and 621 are regarded as second pixels. Next, the first pixels 613 and 622 are also regarded as second pixels since the difference between grayscale values of the first pixel 612 and its right adjacent pixel 613 is less than 20 and the difference between grayscale values of the first pixel 612 and its lower adjacent pixel 622 is also less than 20. After applying the retrieving algorithm to all remaining first pixels, second pixels 623, 631, 632, and 633 that comprise smooth region 711 as shown in FIG. 7 are obtained.

It is noted that for a boundary pixels of a smooth region, such as the first pixels 623 and 633 in smooth region 711, the algorithm could be further modified because the difference between grayscale values of those boundary pixels and their right adjacent pixel and the difference between grayscale values of those boundary pixels and their lower adjacent pixel may not satisfy all the criterion. The algorithm could be further modified, for example, by also considering a left adjacent pixel and an upper adjacent pixel. Thus, for boundary pixel 623 of smooth region 711, if the difference between grayscale values of the pixel 623 and its left adjacent pixel 622 is less than 20 and the difference between grayscale values of the pixel 623 and its upper adjacent pixel 613 is also less than 20, and if pixels 613 and 622 are second pixels, pixel 623 can also be regarded as a second pixel.

After applying the retrieving algorithm to all remaining first pixels in image 600, smooth regions 712 and 713 that comprise a plurality of second pixels as shown in FIG. 7 are obtained. It is also noted that for a boundary pixel in an image, such as the first pixels 662 and 663 in image 600, the algorithm could be modified to only consider the right adjacent pixel because there is no lower adjacent pixel for pixels 662 and 663. After obtaining the second pixels in image 600, image analyzer 102 accesses a gain from memory buffer 103, and applies the gain to image 600 for adjusting the corresponding pixel values of the first pixels in the image 600.

Figure 8:
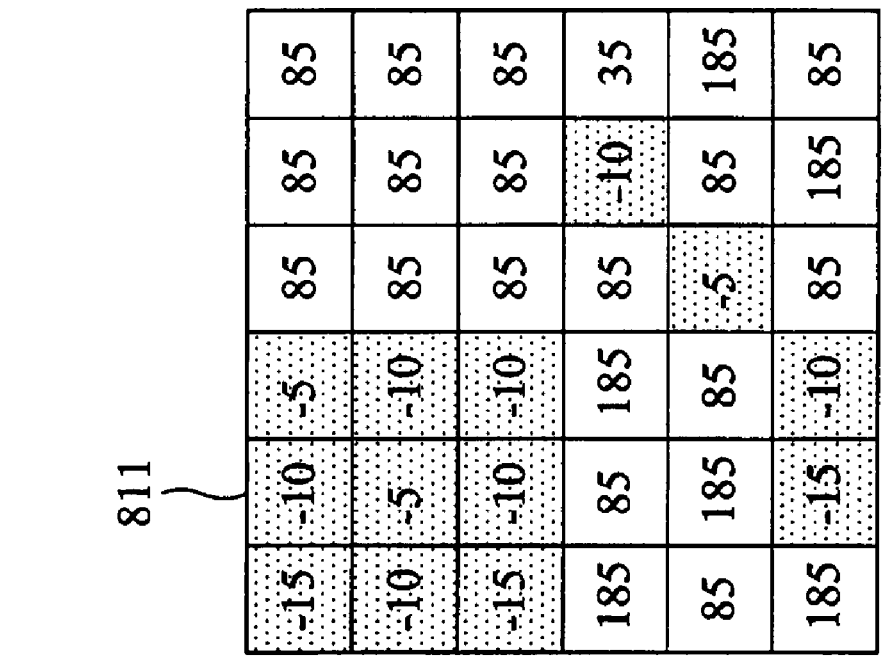
FIG. 8 illustrates the gained 8-bit grayscale image.

The gain can be set as any number according to the different image enhancement requirements. FIG. 8 illustrates an image 601 that is obtained by applying a gain to image 600 for adjusting the corresponding pixel values of the first pixels, wherein the gain is set as −15 and the gain is added to the corresponding pixel values of the first pixels in image 600. Thus, image 601 comprises 36 first pixels each having a gained pixel value. Since the gain is a negative number, the grayscale values in image 200 are decreased and some of them (the dotted pixels shown in FIG. 8) are distorted due to weighting to a value less than 0.

Next, image analyzer 102 starts to estimate an amount of distortion. When estimating the amount of distortion, different weighting factors can be applied to the distorted pixels with different distribution characteristic. Thus, the estimated distortion is an amount of distortion estimated with the consideration of the distribution characteristics of the image. In the embodiment of the invention, the amount of distortion of image 601 can be obtained by using function (1.1), wherein K is set as the minimum pixel value, that is 0, x is the pixel with gained pixel value not exceeding 0, and $z_x$ is set as 1.5 when x is inside the smooth regions 711~713 shown in FIG. 7 or set as 1 when x is not inside the smooth regions 711~713. In FIG. 8, since the distorted pixels 645 and 654 are not inside the smooth regions 711~713, the weighting factor is set as 1, and since the remaining distorted pixels are inside smooth regions 711 and 712 respectively, the weighting factor is set as 1.5.

Thus, the amount of distortion estimated according to function (1.1) by image analyzer 102 is 187.5.

After obtaining the estimated amount of distortion, image analyzer 102 transmits the estimated amount of distortion to image processor 104. Image processor 104 determines whether the gain should be updated or not according to the estimated amount of distortion. In order to determine whether the gain should be updated or not, an acceptable amount of distortion can be previously set. If the estimated amount of distortion exceeds the acceptable amount of distortion, it means that the distortion after applying the gain is not acceptable. Thus, the gain can be further increased or decreased. According to the embodiment of invention, if the acceptable amount of distortion is set as 160, the estimated amount of distortion which exceeds 160 indicates that the gain should be increased to a larger value. Thus, image processor 104 updates the gain to another number, such as −7, applies the updated gain to the corresponding pixel values of the first pixels in the image 600, and obtains a processed image. Display device 105 displays the processed image received from image processor 104.

The algorithm for obtaining the second pixels may further limit the size of smooth region. For example, only the region that comprises more than four would be recognized as the smooth region. Under this limitation, pixels 662 and 663 may not be regarded as second pixels since there are only two pixels comprised within the region 712.

Figure 9:
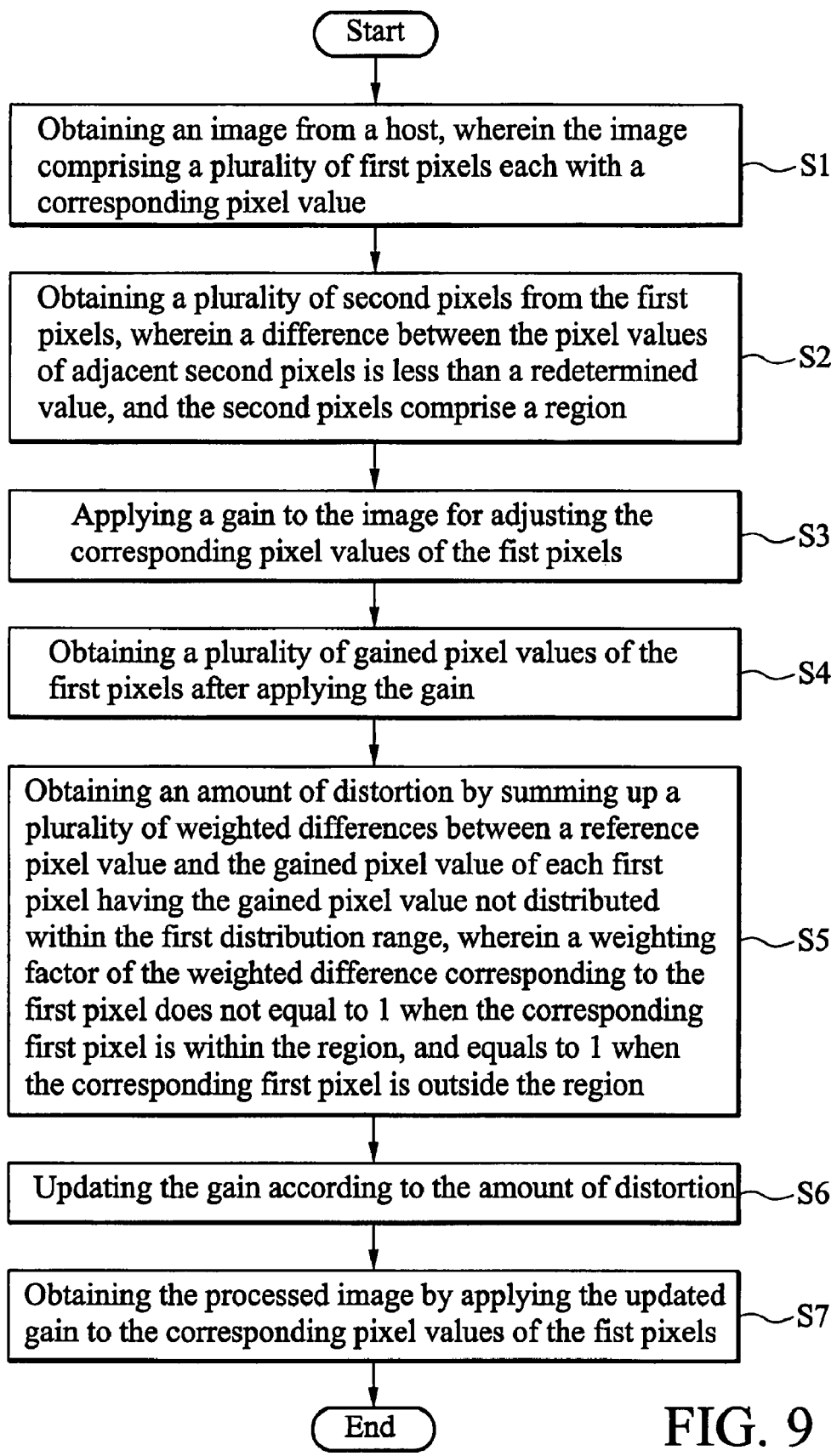
FIG. 9 illustrates a flow chart of the image processing method according an embodiment of the invention.

FIG. 9 illustrates a flow chart of the image processing method according an embodiment described above. First, an image is obtained from a host, wherein the image comprises a plurality of first pixels each having a corresponding pixel value (S1). Next, a plurality of second pixels are obtained from the first pixels, wherein a difference between the pixel values of adjacent second pixels is less than a predetermined value, and the second pixels comprise a region (S2). Next, a gain is applied to the image for adjusting the corresponding pixel values of the first pixels (S3). Next, a plurality of gained pixel values of the first pixels are obtained after applying the gain (S4). Next, an amount of distortion is obtained by summing up a plurality of weighted differences between a reference pixel value and the gained pixel value of each first pixel having the gained pixel value not distributed within the first distribution range, wherein a weighting factor of the weighted difference corresponding to the first pixel does not equal to 1 when the corresponding first pixel is within the region, and equals to 1 when the corresponding first pixel is outside the region (S5). Next, the gain is updated according to the amount of distortion (S6). Finally, the processed image is obtained by applying the updated gain to the corresponding pixel values of the first pixels (S7).

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An image processing method applied in an image processor, the image processor receiving an image from a host and outputting a processed image to a display device, the image comprising a plurality of first pixels each having a corresponding pixel value, the corresponding pixel values of the first pixels are distributed within a first distribution range, wherein the first distribution range is bounded between a maximum pixel value and a minimum pixel value, the image processing method comprising:

obtaining a plurality of second pixels from the first pixels, wherein a difference between the pixel values of adjacent second pixels is less than a predetermined value, and the second pixels comprise a region;

applying a gain to the image for adjusting the corresponding pixel values of the first pixels;

obtaining a plurality of gained pixel values of the first pixels after applying the gain;

obtaining an amount of distortion by summing up a plurality of weighted differences between a reference pixel value and the gained pixel value of each first pixel having the gained pixel value not distributed within the first distribution range, wherein a weighting factor of the weighted difference corresponding to the first pixel does not equal to 1 when the corresponding first pixel is within the region, and equals to 1 when the corresponding first pixel is outside the region;

updating the gain according to the amount of distortion; and obtaining the processed image by applying the updated gain to the corresponding pixel values of the first pixels in the image.

2. The image processing method as claimed in claim 1, wherein the pixel value is a grayscale value.

3. The image processing method as claimed in claim 1, wherein when a summation of the difference between the corresponding pixel values of the first pixel and its right adjacent pixel and the difference between the corresponding pixel values of the first pixel and its left adjacent pixel is less than the predetermined value, the first pixel is regarded as the second pixels.

4. The image processing method as claimed in claim 3, wherein the predetermined value is set as 32 for an 8-bit grayscale image.

5. The image processing method as claimed in claim 1, wherein when the difference between the corresponding pixel values of the first pixel and its right adjacent pixel is less than the predetermined value, the first pixel and its right adjacent pixel are regarded as the second pixels.

6. The image processing method as claimed in claim 1, wherein when the difference between the corresponding pixel values of the first pixel and its right adjacent pixel and the difference between the corresponding pixel values of the first pixel and its lower adjacent pixel are less than the predetermined value, the first pixel, the right adjacent pixel of the first pixel, and the lower adjacent pixel of the first pixel are regarded as the second pixels.

7. The image processing method as claimed in claim 1, wherein the second pixels are obtained from the first pixel when the corresponding pixel values of the second pixels are distributed within a second distribution range other than the first distribution range.

8. The image processing method as claimed in claim 1, wherein the weighting factor of the weighted difference corresponding to the first pixel exceeds 1 when the corresponding first pixel is within the region.

9. The image processing method as claimed in claim 1, wherein the reference pixel value is set as the maximum pixel value and the amount of distortion is obtained by summing up the weighted differences between the reference pixel value and the gained pixel value of each first pixel having the gained pixel value exceeding the maximum pixel value.

10. The image processing method as claimed in claim 9, wherein the gain is decreased when the amount of distortion exceeds a reference amount of distortion.

11. The image processing method as claimed in claim 1, wherein the reference pixel value is set as the minimum pixel value and the amount of distortion is obtained by summing up the weighted differences between the reference pixel value and the gained pixel value of each first pixel having the gained pixel value less than the minimum pixel value.

12. The image processing method as claimed in claim 11, wherein the gain is increased when the amount of distortion exceeds a reference amount of distortion.

13. An image processing apparatus for processing an image provided by a host and outputting a processed image to a display device, the image comprising a plurality of first pixels each having a corresponding pixel value, the corresponding pixel values of the first pixels are distributed within a first distribution range, wherein the first distribution range is bounded between a maximum pixel value and a minimum pixel value, the image processing apparatus comprising:
   a memory buffer storing gain data indicating a gain;
   an image analyzer obtaining a plurality of second pixels from the first pixels, wherein a difference between the pixel values of adjacent second pixels is less than a predetermined value, and the second pixels comprise a region, accessing the gain data stored in the memory buffer, applying the gain corresponding to the gain data to the image for adjusting the corresponding pixel values of the first pixels, obtaining an amount of distortion by summing up a plurality of weighted differences between a reference pixel value and the gained pixel value of each first pixel having the gained pixel value not distributed within the first distribution range, wherein a weighting factor of the weighted difference corresponding to the first pixel does not equal to 1 when the corresponding first pixel is within the region, and equals to 1 when the corresponding first pixel is outside the region; and
   an image processor updating the gain data stored in the memory buffer according to the amount of distortion, and obtaining the processed image by applying the updated gain corresponding to the updated gain data to the corresponding pixel values of the first pixels in the image.

14. The image processing apparatus as claimed in claim 13, wherein the pixel value is a grayscale value.

15. The image processing method as claimed in claim 13, wherein when a summation of the difference between the corresponding pixel values of the first pixel and its right adjacent pixel and the difference between the corresponding pixel values of the first pixel and its left adjacent pixel is less than the predetermined value, the first pixel is regarded as the second pixels.

16. The image processing method as claimed in claim 13, wherein the predetermined value is set as 32 for an 8-bit grayscale image.

17. The image processing apparatus as claimed in claim 13, wherein when the difference between the corresponding pixel values of the first pixel and its right adjacent pixel is less than the predetermined value, the first pixel and its right adjacent pixel are regarded as the second pixels.

18. The image processing apparatus as claimed in claim 13, wherein when the difference between the corresponding pixel values of the first pixel and its right adjacent pixel and the difference between the corresponding pixel values of the first pixel and its lower adjacent pixel are less than the predetermined value, the first pixel, the right adjacent pixel of the first pixel, and the lower adjacent pixel of the first pixel are regarded as the second pixels.

19. The image processing apparatus as claimed in claim 13, wherein the second pixels are obtained from the first pixel when the corresponding pixel values of the second pixels are distributed within a second distribution range other than the first distribution range.

20. The image processing apparatus as claimed in claim 13, wherein the weighting factor of the weighted difference corresponding to the first pixel exceeds 1 when the corresponding first pixel is within the region.

21. The image processing apparatus as claimed in claim 13, wherein the reference pixel value is set as the maximum pixel value and the amount of distortion is obtained by summing up the weighted differences between the reference pixel value and the gained pixel value of each first pixel having the gained pixel value exceeding the maximum pixel value.

22. The image processing apparatus as claimed in claim 21, wherein the gain is decreased when the amount of distortion exceeds a reference amount of distortion.

23. The image processing apparatus as claimed in claim 13, wherein the reference pixel value is set as the minimum pixel value and the amount of distortion is obtained by summing up the weighted differences between the reference pixel value and the gained pixel value of each first pixel having the gained pixel value less than the minimum pixel value.

24. The image processing apparatus as claimed in claim 23, wherein the gain is increased when the amount of distortion exceeds a reference amount of distortion.

* * * * *